(12) United States Patent
Niu et al.

(10) Patent No.: US 9,467,819 B2
(45) Date of Patent: Oct. 11, 2016

(54) MULTICAST SERVICE USING UNICAST SUBFRAME

(75) Inventors: Huaning Niu, Milpitas, CA (US); Hujun Yin, Saratoga, CA (US); Yujian Zhang, Beijing (CN); Geng Wu, Plano, TX (US)

(73) Assignee: INTEL CORPORATION, Santa Clara, CA (US)

( * ) Notice: Subject to any disclaimer, the term of this patent is extended or adjusted under 35 U.S.C. 154(b) by 166 days.

(21) Appl. No.: 13/997,218

(22) PCT Filed: Sep. 30, 2011

(86) PCT No.: PCT/US2011/054460
§ 371 (c)(1),
(2), (4) Date: Apr. 21, 2014

(87) PCT Pub. No.: WO2013/048514
PCT Pub. Date: Apr. 4, 2013

(65) Prior Publication Data
US 2014/0226552 A1    Aug. 14, 2014

(51) Int. Cl.
*H04W 4/06* (2009.01)
*H04W 72/12* (2009.01)
*H04L 5/00* (2006.01)
*H04L 1/18* (2006.01)

(52) U.S. Cl.
CPC .............. *H04W 4/06* (2013.01); *H04L 5/0055* (2013.01); *H04W 72/121* (2013.01); *H04L 1/1861* (2013.01)

(58) Field of Classification Search
CPC .. H04W 4/06; H04W 72/121; H04L 5/0055; H04L 1/1861
See application file for complete search history.

(56) References Cited

U.S. PATENT DOCUMENTS

| | | | |
|---|---|---|---|
| 2009/0286468 A1* | 11/2009 | Kim | H04L 1/1887 455/3.03 |
| 2010/0103852 A1* | 4/2010 | Jactat | H04W 72/005 370/312 |
| 2010/0172290 A1* | 7/2010 | Nam | H04L 1/1854 370/328 |

(Continued)

FOREIGN PATENT DOCUMENTS

| | | |
|---|---|---|
| CN | 101841771 A | 9/2010 |
| CN | 101841773 A | 9/2010 |

(Continued)

OTHER PUBLICATIONS

International Preliminary Report on Patentability and Written Opinion received for PCT Patent Application No. PCT/US2011/054460, mailed on Apr. 10, 2014, 6 Pages.

(Continued)

*Primary Examiner* — Afshawn Towfighi
(74) *Attorney, Agent, or Firm* — Thorpe North & Western, LLP

(57) ABSTRACT

A system and method for multicast servicing in a unicast subframe is disclosed. The method using a transmission station comprises the operation of setting up a multicast service on each of a plurality of mobile devices in a multicast group using a multicast cell radio network temporary identifier (MC-RNTI) with a common cell identifier (CID). The operation of allocating physical downlink shared data channel (PDSCH) resources for the multicast group using a physical downlink control channel (PDCCH) masked by the MC-RNTI follows.

17 Claims, 8 Drawing Sheets

(56) References Cited

U.S. PATENT DOCUMENTS

| | | | | |
|---|---|---|---|---|
| 2010/0195607 A1* | 8/2010 | Lee | ............... | H04W 74/0866 370/329 |
| 2011/0013574 A1 | 1/2011 | Hsu | | |
| 2012/0201188 A1* | 8/2012 | Ishii | ............... | H04L 5/0023 370/313 |
| 2013/0010722 A1* | 1/2013 | Suzuki | ............... | H04L 1/1854 370/329 |

FOREIGN PATENT DOCUMENTS

| | | | |
|---|---|---|---|
| EP | 2276276 A2 | 1/2011 | |
| WO | 2011/040595 A1 | 4/2011 | |
| WO | 2013/048514 A1 | 4/2013 | |

OTHER PUBLICATIONS

International Search Report and Written Opinion received for PCT Application No. PCT/US2011/054460, mailed on Apr. 20, 2012, 9 pages.

Huawei et al., "Unicast transmission in MBMS subframe", 3GPP TSG-RAN, WG2 Meeting #67, R2-094421, Aug. 24-28, 2009.

Search report for European application 11872951.6 dated Jun. 15, 2015, 6 pages.

* cited by examiner

MULTICAST SERVICE USING UNICAST SUBFRAME

BACKGROUND

Wireless mobile communication technology uses various standards and protocols to transmit data between a transmission station and a wireless mobile device. Some wireless devices communicate using an orthogonal frequency-division multiplexing (OFDM) digital modulation scheme via a physical layer. OFDM standards and protocols can include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. In 3GPP radio access networks (RANs) in LTE systems, the transmission station can be a combination of evolved Node Bs (also commonly denoted as enhanced Node Bs, eNodeBs, or eNBs) and Radio Network Controllers (RNCs) in a Universal Terrestrial Radio Access Network (UTRAN), which communicates with the wireless mobile device, known as a user equipment (UE). A downlink (DL) transmission can be a communication from the transmission station (or eNodeB) to the wireless mobile device (or UE), and an uplink (UL) transmission can be a communication from the wireless mobile device to the transmission station. In a downlink transmission, the transmission station can communicate with a single wireless mobile device with a unicast subframe using a unicast service. Alternatively, the transmission station can communicate with a plurality of wireless mobile devices with a multicast\broadcast single-frequency network (MBSFN) subframe using a multimedia broadcast multicast service (MBMS).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
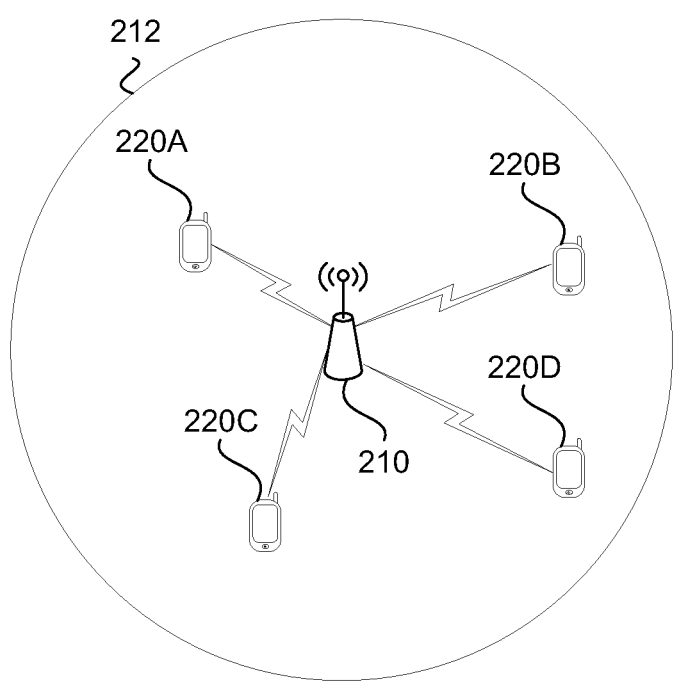
FIG. 1 illustrates a block diagram of a multicast service in a single cell in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

With the proliferation of mobile devices with video capability, video conference calls are becoming an increasing popular method to communicate with other video phone systems and other mobile devices. In a 3GPP LTE network, multi-cast and broadcast is supported using a multimedia broadcast multicast service (MBMS) in a multicast\broadcast single-frequency network (MBSFN) subframe. Multicast is the delivery of a message or information to a group of destination devices simultaneously in a single transmission from the source. Broadcast refers to the delivery of a message or information to a large group of destination devices simultaneously in a single transmission from the source. The MBSFN subframe can be effective for live broadcasting for large audience, but may not be efficient for other multicast services, such as a video conference service. Typically in the LTE network, a unicast service using a unicast subframe is used to deliver downlink video during video conferencing to each user (via a mobile device) on a one by one basis. The unicast service can be an inefficient mechanism to deliver some multicast services, which can waste radio resources of a radio access network (RAN) by delivering duplicate multicast packets individually to each mobile device using the unicast subframe.

A multicast service can be performed using a unicast subframe. A unicast subframe can be a non-MBSFN subframe (or non-MBMS subframe). Typically, mobile device traffic uses the unicast subframe unless the subframe is reserved for the MBSFN subframe (or MBMS subframe).

For the multicast service, a transmission station can establish a radio resource control (RRC) connection between each of the mobile devices in the multicast group. The transmission station can setup a multicast service on a plurality of mobile devices in a multicast group using a multicast cell radio network temporary identifier (MC-RNTI) with a common cell identifier (CID). As part of the setup of the multicast service, the transmission station can notify each mobile device in the multicast group of the MC-RNTI using an information element (IE) multicast configuration in RRC signaling.

In an example, a transmission station can assign a different physical uplink control channel (PUCCH) resource for an acknowledge character (ACK) or a negative-acknowledge character (NACK) feedback resource indication for each mobile device in the multicast group. The PUCCH can carry control information in an uplink transmission. Then, the transmission station can notify each mobile device in the multicast group of their PUCCH resource assignment for the ACK or the NACK feedback resource indication using an IE PUCCH configuration in RRC signaling. In another example, the transmission station can assign a different PUCCH resource for the ACK or the NACK feedback resource indication for a subset of mobile devices in the multicast group with a signal to interference plus noise ratio (SINR) below a predetermined level. In another example, the transmission station can initialize a scrambling seed of a scrambler for scrambling the PDCCH and/or data in a PDSCH using the MC-RNTI. Then, the transmission station can allocate physical downlink shared data channel (PDSCH) resources for the multicast group using a physical downlink control channel (PDCCH) masked by the MC-RNTI.

The mobile device can receive the MC-RNTI with the CID for the multicast group from the transmitting station. The MC-RNTI can be shared among the plurality of mobile devices in the multicast group using the IE multicast configuration in RRC signaling. As part of receiving the MC-RNTI, the mobile device can receive a PUCCH resource assignment for the ACK or the NACK feedback resource indication. The PUCCH resource assignment for the mobile device can be different from PUCCH resource assignments of other mobile devices in the multicast group. Then, the mobile device can receive PDCCH masked by the MC-RNTI from the transmitting station. The mobile device can blind detect the PDCCH using the MC-RNTI.

The transmission station can transmit data in the PDSCH configured by the PDCCH. The mobile station can receive the transmission of data in the PDSCH configured by the PDCCH. The mobile station can transmit an ACK or a NACK feedback after receiving a transmission of data in a PDSCH.

The transmission station can receive an ACK or NACK feedback from at least one mobile device. The transmission station can retransmit data when the NACK feedback is received. For a single cell example, the transmission station can transmit and/or retransmit data using cell-specific reference signals (CRS) or UE-specific reference signal (UE-RS). For a multiple cell example, the transmission station can transmit and/or retransmit data using CRS or UE-RS. When CRSs are used then CRS interlacing may be disabled.

In another example, the transmission station can retransmit data using a hybrid automatic repeat request (HARQ) when the NACK feedback is received from a subset mobile device in a subset of mobile devices in the multicast group. The subset mobile device can transmit the NACK feedback when the CRC fails. The CRC can fail when a signal to interference plus noise ratio (SINR) is below a predetermined level for the subset mobile device.

Figure 2:
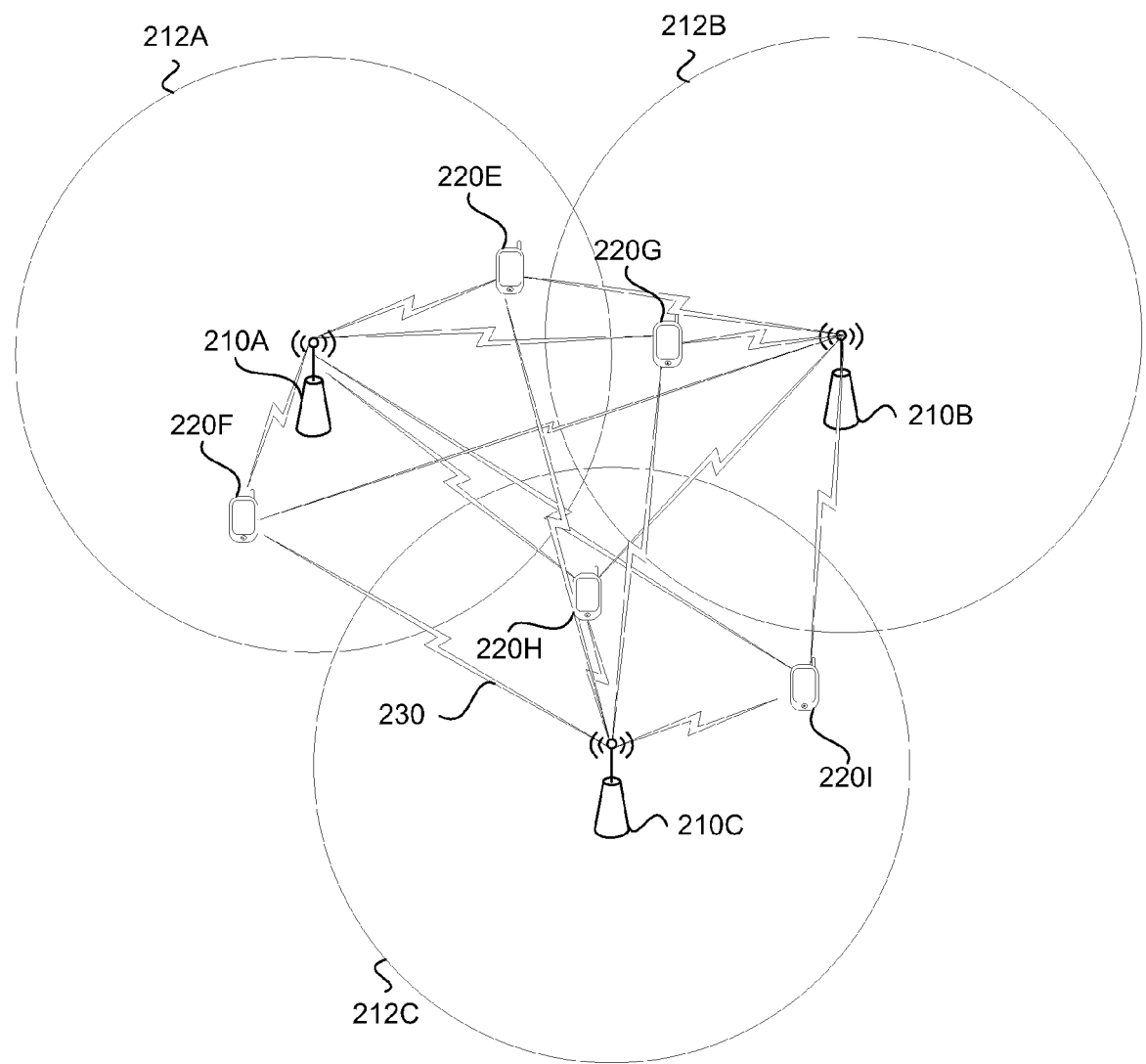
FIG. 2 illustrates a block diagram of a multicast service in multiple cells in accordance with an example.

The multicast service can be used in a single cell or multiple cells. FIG. 1 illustrates a transmission station 210 of single cell 212. Each mobile device 220A-D can communicate wirelessly with the transmission station. FIG. 2 illustrates a plurality of transmission stations 210A-C for a plurality of cells (or multiple cells) 212A-C. Mobile devices 220E-H can communicate wirelessly 230 with each cell via the transmission stations. Using the multicast service for the downlink transmission of a video conference call can dramatically save the radio resources. In the multi-cell case, performance can also be improved by reduced interference from a nearby cell.

A wireless communication system can be subdivided into various sections referred to as layers. In the LTE system, communication layers can include the physical (PHY), media access control (MAC), radio link control (RLC), packet data convergence protocol (PDCP), and radio resource control (RRC) layers. The physical layer can include the basic hardware transmission components of a wireless communication system.

Basic hardware transmission components for a transmitter can include: a channel encoder for protecting binary input data by encoding, an interleaver or scrambler for interleaving against fading phenomenon, a mapper for improving reliability, a beamformer for separating mapped data into layers, a inverse fast Fourier transform (IFFT) modulator for modulating time domain data into OFDM symbols in the frequency domain, a digital-to-analog converter (DAC) for converting modulated signals to analog signals, a radio frequency (RF) transmitter for transmitting the analog signals.

Basic hardware transmission components for a receiver can include: a RF receiver for receiving the analog signals, an analog-to-digital converter (ADC) for converting analog signals to modulated signals, a fast Fourier transform (FFT) demodulator for demodulating the OFDM symbols in the frequency domain into time domain data, a channel estimator for estimating a channel and/or the noise and interference that occurs in the channel, a multiple-input multiple-output (MIMO) decoder for combining demodulated signals, a demapper, a deinterleaver or descrambler, a channel decoder for generating binary output data. The physical layer for the transmitter and/or the receiver can include other components, such as series-to-parallel (S/P) converters, parallel-to-serial (P/S) converters, cyclic prefix (CP) inserters and deleters, guardband inserters and deleters, and other desired components.

Figure 3:
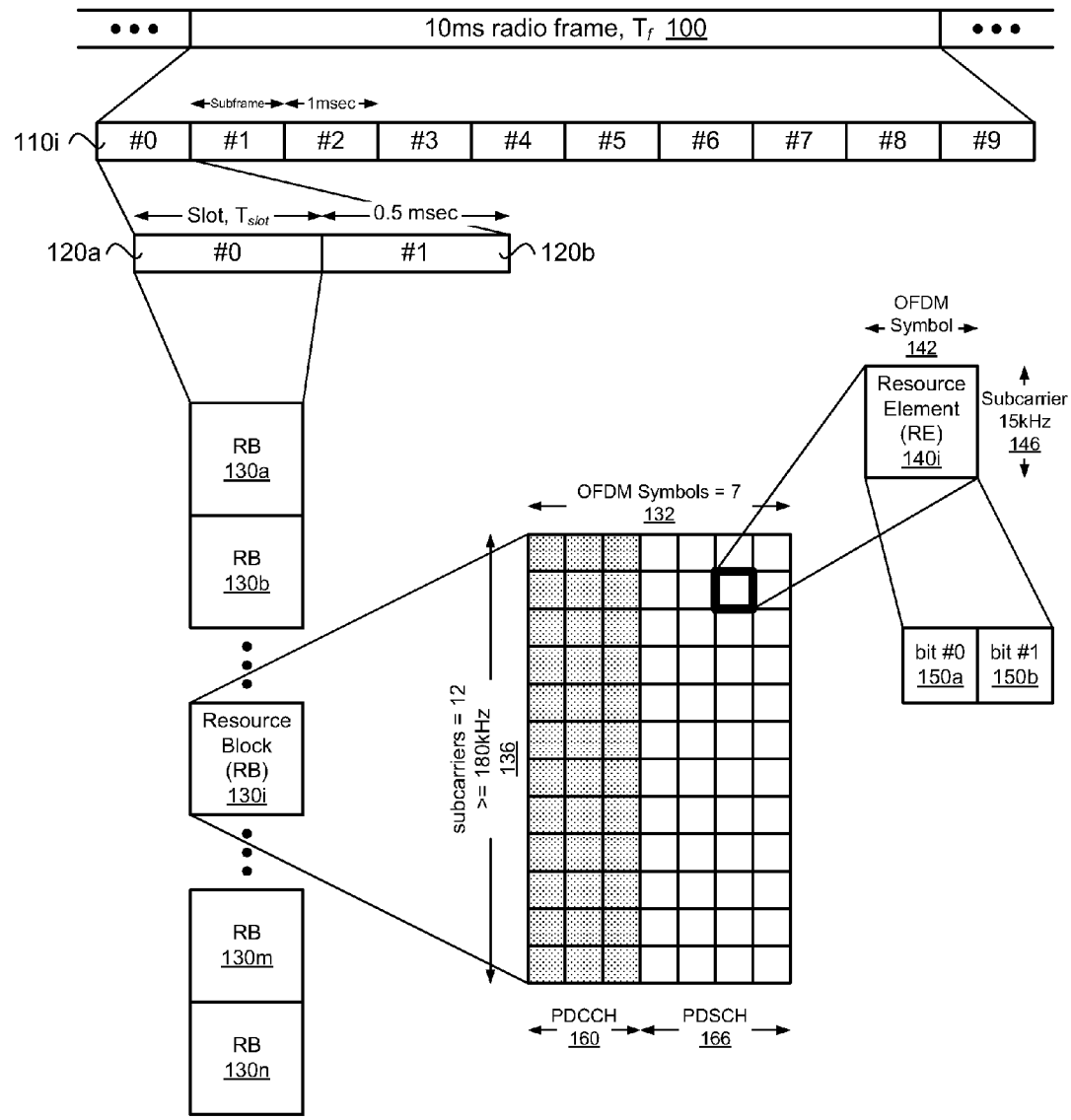
FIG. 3 illustrates a block diagram of radio frame resources in accordance with an example.

In one example, data in wireless mobile communications can be transmitted on the physical (PHY) layer in a downlink transmission by the transmission station (or eNodeB) to the mobile device (or UE) using a generic long term evolution (LTE) frame structure, as illustrated in FIG. 3. While an LTE frame structure is illustrated, a frame structure for an IEEE 802.16 standard (WiMax), an IEEE 802.11 standard (WiFi), or another type of communication standard using OFDM may also be used. An uplink transmission may have a similar frame structure to the downlink transmission.

In the example illustrated in FIG. 3, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. The first slot (#0) 120$a$ can include a physical downlink control channel (PDCCH) 160 and/or a physical downlink shared channel (PDSCH) 166, and the second slot (#1) 120$b$ can include data using the PDSCH. Each slot for a component carrier (CC) used by the transmitting station and the receiving station can include multiple resource blocks (RBs) 130$a$. 130$b$, 130$i$, 130$m$, and 130$n$ based on the CC frequency bandwidth. Each RB (physical RB or PRB) 130$i$ can include 12-15 kHz subcarriers 136 (on the frequency axis) and 6 or 7 orthogonal frequency-division multiplexing (OFDM) symbols 132 (on the time axis) per subcarrier. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Reference signals can be transmitted by OFDM symbols via resource elements in the resource blocks. Reference signals (or pilot signals or tones) can be known signals used for various reasons, such as to estimate a channel and/or noise in the channel. Reference signals can be received and transmitted by transmitting stations and mobile communication devices. Different types of reference signals (RS) can be used in an RB. For example, in LTE systems, downlink reference signal types can include a cell-specific reference signal (CRS), a multicast\broadcast single-frequency network (MBSFN) reference signal, a UE-specific reference signal (UE-specific RS or UE-RS) or a demodulation reference signal (DMRS), positioning reference signal (PRS), and a channel-state information reference signal (CSI-RS).

The CRS can be transmitted in downlink subframes in a cell supporting a PDSCH. Data is transmitted from an eNodeB to a UE via a PDSCH. A PDCCH is used to transfer downlink control information (DCI) that informs the UE about resource allocations or scheduling related to downlink resource assignments on the PDSCH. A PDCCH is also used to transfer uplink control information (UCI) that informs UE about uplink resource grants, and uplink power control commands. The PDCCH can be transmitted prior to the PDSCH in each subframe transmitted from the eNode B to the UE. The MBSFN reference signal can be transmitted when the physical multicast channel (PMCH) is transmitted in a MBSFN subframe. The UE-RS or DMRS can be transmitted in downlink subframes supporting the PDSCH. The UE-RS (DMRS) can be transmitted within the resource blocks assigned for downlink shared channel (DL-SCH) transmission to a specific terminal (mobile communication device), used for beamforming to a single UE using multiple antennas, and used for PDSCH demodulation. The PRS can be transmitted in an RB in downlink subframe configured for PRS transmission, but may not be mapped to a physical broadcast channel (PBCH), a primary synchronization signal (PSS), or a secondary synchronization signal (SSS). The CSI-RS can be used for downlink channel quality measurements.

Figure 4:
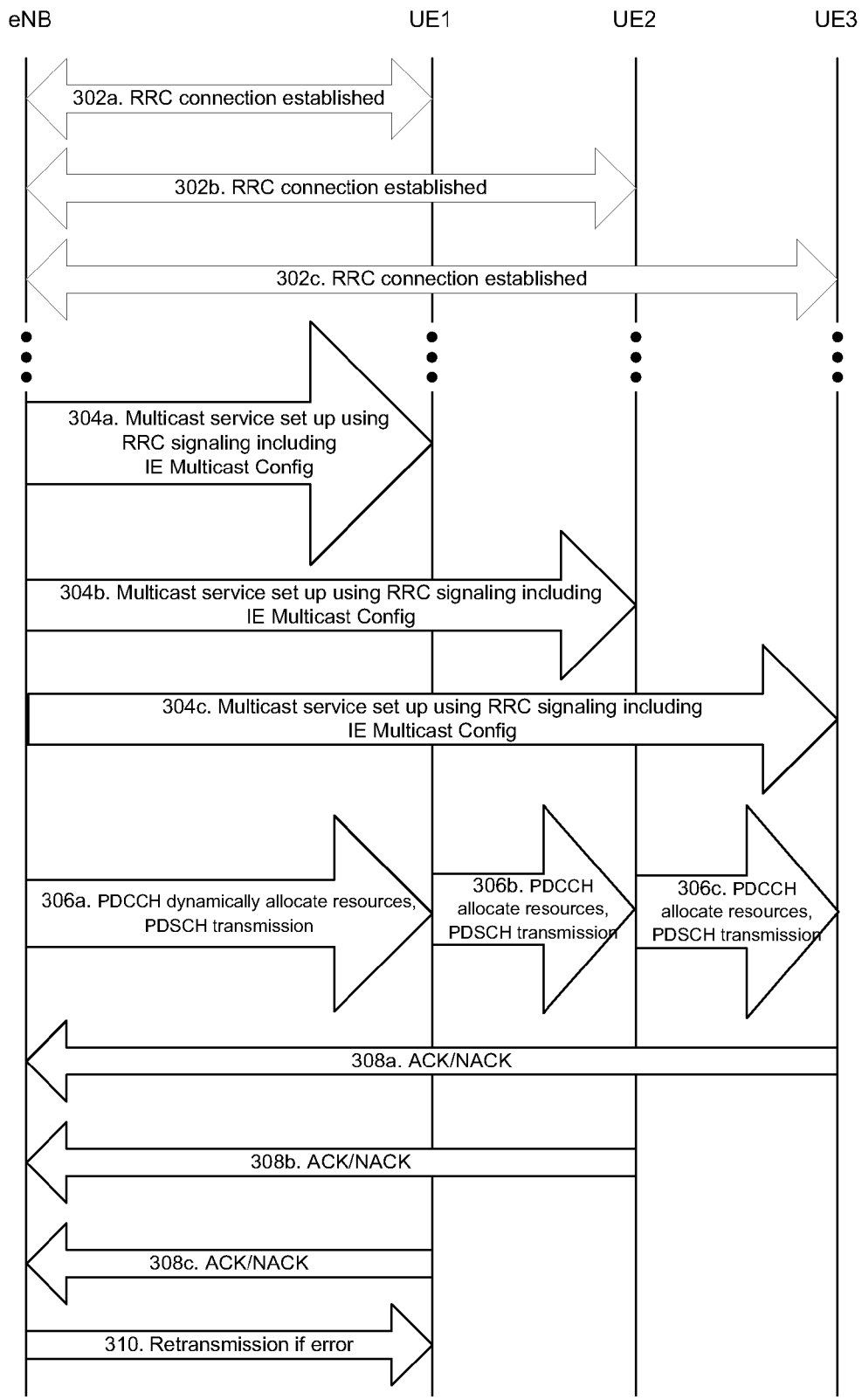
FIG. 4 illustrates an example process for multicast servicing in an unicast subframe using a transmission station and three mobile devices in accordance with an example.

With this background of the physical layer downlink and uplink channels, a multicast service framework using a unicast subframe can be described in another example. FIG. 4 illustrates an example process for multicast servicing in a unicast subframe using a transmission station (eNB) and three mobile devices (UE1, UE2, and UE3). An eNB can establish an RRC connection 302a, 302b, and 302c with each of the UEs in the multicast group. Although three UEs are shown, any number of UEs can form a multicast group. RRC signaling handles the control plane signaling via a Layer 3 communication link in advance of sending the PDCCH for a subframe. The RRC protocol and functions for a UE can include connection establishment and release, broadcast of system information, a radio bearer establishment/reconfiguration and release, RRC connection mobility procedures, paging notification and release, and/or outer loop power control. RRC signaling may also be used for scheduling and searching PDCCH search spaces used in blind decoding. One RRC connection may be open to a UE at any given time. RRC connection establishment can be used to make the transition from RRC idle mode to RRC connected mode. Each UE makes the transition to an RRC connected mode before transferring application data (such as browsing the internet, sending or receiving an email, or video conferencing), or completing signaling procedures. The RRC connection establishment procedure can be initiated by each UE but can be triggered by either the UE or the network. The RRC signaling can be transmitted via information elements (IE), such as an RRC connection setup message which can define configuration information for the PDSCH, PUCCH and PUSCH physical channels.

The eNB can define the MC-RNTI with the CID per multicast group. A cell radio network temporary identifier (C-RNTI) allows the eNB identify the UE and communicate directly with the UE. The C-RNTI can be a UE identifier allocated by the eNB and unique within one cell controlled by that eNB. The C-RNTI can be reallocated when a UE moves to a new cell. The common CID allows each UE in the cell to receive and decode the same downlink transmission simultaneously. The eNB can notify each UE participating in the multicast group of the MC-RNTI using RRC signaling. Stated another way, the eNB can setup a multicast service using RRC signaling including IE multicast configuration 304a, 304b, and 304c on each of the UEs in the multicast group. The IE multicast configuration can include the MC-RNTI with the common CID.

In another example, each UE can be assigned by the eNB a different PUCCH resource assignment $n_{PUCCH}^{(1,\tilde{p})}$ for an ACK/NACK feedback resource indication where n is a subframe number for a transmission of a HARQ-ACK on an antenna port p for a PUCCH format 1a/1b for frequency-division duplexing (FDD) and time-division duplexing (TDD) ACK/NACK feedback. The eNB can notify each UE in the multicast group of their PUCCH resource assignment for the ACK or the NACK feedback resource indication using an IE PUCCH configuration in RRC signaling. In another example, the transmission station can assign a different PUCCH resource for the ACK or the NACK feedback resource indication for a subset of UEs in the multicast group based on a transmission quality factor, such a signal to interference plus noise ratio (SINR) below a predetermined level, or a level indicating a poor channel quality indicator (CQI) report, a poor preceding matrix indicator (PMI) report, or a poor transmission rank indicator (RI) report.

The ACK can be a transmission control character transmitted by a receiving station (UE) as an acknowledgement (i.e., an affirmative response to the sending station) in response to a transmitting station's (eNB's) transmission of a message. When the message is not properly received or a transmission error occurs, a NACK can be transmitted by the receiving station. A NACK can be automatically generated by the eNB after a predetermined time for receiving the ACK or the NACK has expired. The predetermined time can be a default time set by the eNB or UE, or the time can be determined by the application generating the data to be transmitted. Hybrid automatic repeat request (Hybrid ARQ or HARQ) can be a combination of high-rate forward error-correcting coding, and automatic repeat request (ARQ)

error-control for detectable-but-uncorrectable errors. In standard ARQ, redundant bits are added to data to be transmitted using an error-detecting code such as cyclic redundancy check (CRC). In HARQ, a code can be used that can perform both forward error correction (FEC) in addition to error detection (ED) (such as Reed-Solomon code, convolutional code or Turbo code), to correct a subset of all errors while relying on ARQ to correct errors that are uncorrectable using the redundancy sent in the initial transmission. As a result HARQ can perform better than ordinary ARQ in poor signal conditions, but can come at the expense of significantly lower throughput in good signal conditions.

The eNB can dynamically allocate resources and transmit the PDSCH 306a. 306b, and 306c to each of the UEs (UE1, UE2, and UE3) in the multicast group in a single transmission, which can be decoded by each of the UEs in the multicast. Providing further detail for step 306a, 306b, and 306c, the eNB can send a PDCCH for resource allocation of the PDSCH. The PDCCH can be masked by the MC-RNTI. The MC-RNTI or C-RNTI can be used by the encoder or scrambler to allow the UEs to receive the transmissions intended for the UEs. Masking the PDCCH allows UEs with a matching MC-RNTI to decode the message. The scrambling seed of the scrambler or the decoder can be initialized using the MC-RNTI with the common CID, such as CID=0, to scramble the payload, where the payload can be the data on the PDSCH. Data, such as a video conference call, can be transmitted via the PDSCH.

At the UEs, each UE can blind detect (blind decode) the PDCCH using the previously transmitted MC-RNTI. For a multicast allocation example, each UE can decode the PDCCH and the PDSCH and feedback an ACK/NACK response 308a, 308b, and 308c to the eNB. When ACK/NACK feedback is enabled, the eNB can retransmit the message if a transmission error occurs 310. A transmission error may be indicated by the NACK feedback. Retransmission can be provided to all the UEs in the multicast group or a subset of the UEs in the multicast group based on some subset criteria, such as a transmission quality factor. For example, the eNB can send one or two retransmission depending the application's delay constraint. The retransmission can be sent using either a unicast or multicast transmission. In another example, ACK/NACK feedback may not be enabled and no retransmission of the message may occur.

The UE can perform blind decoding since the UE may only be informed of the number of OFDM symbols within the control region of a subframe and may not be provided with the location of the UE's corresponding PDCCH. The UE can find the UE's PDCCH by monitoring and decoding a set of PDCCH candidates (a number of OFDM symbols within the control region of a subframe) for the DCI in every subframe in a process referred to as blind decoding.

At a receiver end (UE in a downlink) after performing de-precoding, symbol combining, symbol demodulation and de-scrambling, the UE can perform blind decoding at the PDCCH payload as the UE may not be aware of the detailed control channel structure, including the number of control channels and the number of control channel elements (CCEs) to which each control channel (CCH) is mapped. Multiple PDCCHs can be transmitted in a single subframe which may and may not be all relevant to a particular UE. The UE can find the PDCCH specific to the UE by monitoring a set of PDCCH candidates (a set of consecutive CCEs on which PDCCH can be mapped) in every subframe. The UE can use its radio network temporary identifier (RNTI) to try and decode candidates. The RNTI can be used to demask a PDCCH candidate's cyclic redundancy check (CRC). If no CRC error is detected, the UE can consider the PDCCH candidate as a successful decoding attempt and can read the control information within the successful candidate.

For a single cell example, the eNB can transmit and/or retransmit the multicast service data using either CRS or UE-RS. For a multiple cell or multi-cell example, the eNB can transmit and/or retransmit data using either CRS or UE-RS. If CRS is used, the CRS interlace may be disabled. The CRS interlace can cell-specific frequency shift the CRS and/or data by a $v_{shift}$ which applies to a specific cell and cell number. Since multiple cells may be used, the CRS interlace may not apply to multicast service in multiple cells. An interlacer can perform the CRS interlace.

At least two ACK/NACK feedback and HARQ re-transmission options may be used when the number of users involved in the multicast group is large, in addition to the options already discussed. In an example, the eNB may enable ACK/NACK and HARQ re-transmission for a subset of users based on some criteria, such as a weak SINR or transmission quality factor. The PUCCH resource assignment $n_{PUCCH}^{(1,p)}$ in a multicast configuration MAC IE may be provided to a subset of UEs in the multicast group, so only ACK/NACK feedback from the subset UE may be valid. In another example, the ACK/NACK may be disabled, which may be similar to the MBMS framework. An MBMS transmission does not use the ACK/NACK feedback.

The multicast service using a unicast subframe can be more efficient and provide more reliability than either the MBMS in dedicated MBSFN subframe, or the unicast service in the unicast subframe. Neither the MBMS nor unicast service may be efficient in supporting a small group of multicast users who want reliable transmission, which can be provided by ACK/NACK feedback.

In another example, the multicast service can be provided by a processing module and a transceiver in a transmission station. The processing module can be configured to generate the MC-RNTI with the common CID, allocate the PDSCH resources with a PDCCH, and mask PDCCH with the MC-RNTI. In addition, the processing module can be configured to generate the PUCCH resource assignment for the ACK or the NACK feedback resource indication to at least two mobile devices. Each mobile device in the multicast group with a PUCCH resource assignment can have a different PUCCH resource assignment from other mobile devices with PUCCH resource assignments. The transceiver module can be configured to transmit the PDCCH and the MC-RNTI to the mobile device using the IE multicast configuration in RRC signaling. Moreover, the transceiver module can be configured to transmit the PUCCH resource assignment to each mobile device using RRC signaling, receive an ACK or a NACK feedback from at least one mobile device, and retransmit a hybrid automatic repeat request (HARQ) when a NACK feedback is received or generated by the transmission station.

The multicast service using the unicast subframe can be implemented using a centralized, cooperative, or cloud radio access network (C-RAN). In the C-RAN, the transmission station (or eNodeB) functionality can be subdivided between a base band unit (BBU) processing pool and a remote radio unit (RRU) or a remote radio head (RRH) with optical fiber connecting the BBU to the RRU. The C-RAN architecture can provide a platform for efficient delivery of unicast subframe of the multicast service. The purpose and components of a C-RAN are briefly reviewed.

The proliferation of the mobile broadband internet has increased the mobile internet traffic and load on the transmission station, such as an eNodeB, and the core network in the RAN. A typical RAN architecture can include an eNodeB which connects to a fixed number of sector antennas that can cover a small area and that can handle transmission/reception signals in the sector coverage area. In addition, the typical RAN can be limited by interference, so improving spectrum capacity can be limited.

C-RAN can provide centralized processing, co-operative radio, and real-time cloud infrastructure RAN. Centralized signal processing can greatly reduce the number of site equipment rooms needed to cover the same area as a traditional RAN. Co-operative radio with distributed antenna equipped by a remote radio unit (RRU) can provide higher spectrum efficiency than the traditional RAN. A real-time cloud infrastructure based on an open platform and transmission station virtualization can enable processing power aggregation and dynamic allocation, which can reduce the power consumption and increase infrastructure utilization rate. C-RAN can provide reduced cost and lower energy consumption, higher spectral efficiency, support multiple standards and smooth evolution, and better internet services to end users.

A typical characteristic of a mobile network is that mobile devices frequently move from one place to another. The movement of mobile devices can have a time-geometry trend. During work hours, a large number of mobile devices move from residential areas to central office areas and industrial areas for work. During evening hours or non-work hours, mobile devices move back to the residential areas (e.g., homes) or entertainment areas. Thus, the network load moves in the mobile network with a similar pattern.

More specifically, each eNodeB's processing capability may be used by the active mobile devices within the eNodeB's cell range. When mobile devices move outside the eNodeB's cell range, the eNodeB can remain idle with a large portion of the eNodeB's processing power wasted. In a macro view of the mobile network, the eNodeBs in residential areas or entertainment areas may be largely idle during work hours, and the eNodeBs in central office areas and industrial areas may be largely idle during non-work hours. The C-RAN architecture can allow eNodeB processing to be utilized in both the residential and/or entertainment areas and the central office and/or industrial areas during both work hours and non-work hours, thus balancing the network load and reducing the idle time of eNodeB processors and increasing the coverage area of the eNodeB.

Figure 5:
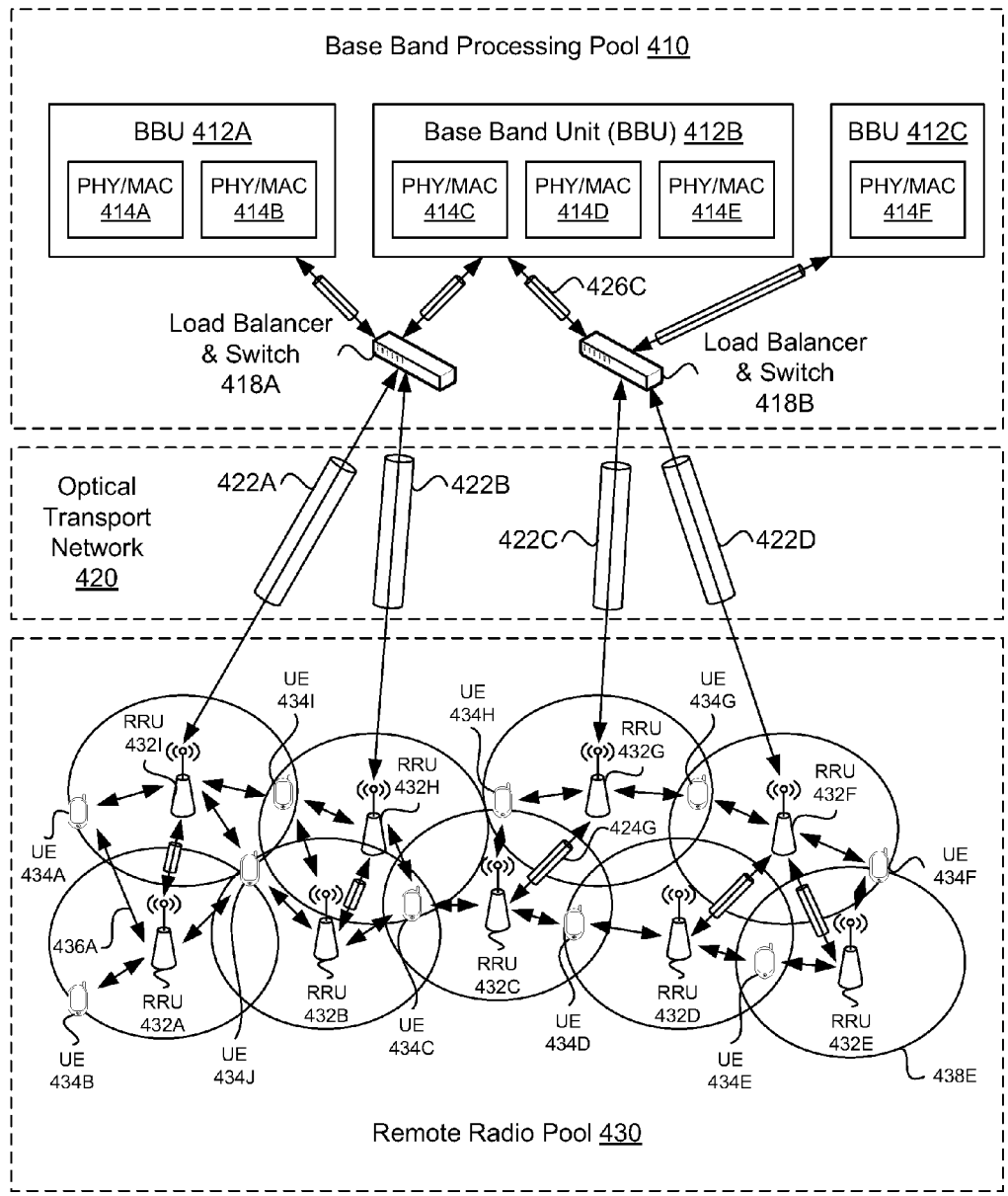
FIG. 5 illustrates a block diagram of a base band unit (BBU) and a remote radio unit (RRU) configuration of a centralized radio access network (C-RAN) in accordance with an example.

As illustrated in FIG. 5, the C-RAN can be composed of three parts: a remote radio pool 430 equipped by remote radio units (RRUs) 432A-I with antennas, a base band processing pool 410 including base-band units (BBUs) 412A-C, and a fiber or cable 422A-D and 424G in a physical transport network 420 connecting at least one of the RRUs in the remote radio pool to at least one of the BBUs in the base band pool. The base band processing pool can be centralized. Each BBU can include a high-performance general purpose processor, a real-time virtualization processor, and/or a physical (PHY) layer processor and/or a MAC layer processor 414A-E The BBUs can be coupled to a load balancer and switch 418A-B via electrical or optical cabling 426C. The physical transport network can be a low-latency transport network, a bandwidth-efficient network, and/or an optical transport network 420 using optical fiber or optical cabling. In another example, the physical transport network can be a high speed electrical transport network. The physical transport network can provide a physical communication link between the BBU and the RRU. The physical communication link can include an optical fiber link or a wired electrical link. The BBU can be referred to as a radio element controller (REC). The RRU can be referred to as a remote radio head (RRH), a remote radio equipment (RRE), a relay station (RS), or a radio equipment (RE). Each RRU can be separated from the BBU by a selected distance. For example, each RRU may be separated from a BBU by at least 50 meters. However, the actual design and layout can depend on system specifications. The actual distance of each RRU may be greater than or less than 50 meters. Each RRU can include a sector, cell, or coverage area 438E for a mobile device, such as a user equipment (UE) 434A-J, where the mobile device may be located within multiple sectors, cells, or coverage areas. The distributed RRUs of the C-RAN can provide a RAN with high capacity and a wide coverage area.

RRUs 432A-I can be smaller, easier to install, easier to maintain, and consume less power than the BBUs 412A-C. The base band processing pool 110 can aggregate the processing power of the BBU through real-time virtualization technology and provide the signal processing capacity to the virtual BTSs or RRUs in the pool. The physical transport network can distribute the processed signals to the RRUs in the remote radio pool 430. The centralized BBU pool can reduce the number of transmission station rooms used for BBUs and can make resource aggregation and large-scale cooperative radio transmission/reception possible. A transmission station room can be an equipment room used to house BBUs of the BBU pool and other transmission station processing equipment. The multicast service using the unicast subframe can be processed by a BBU and transmitted to a plurality of RRUs.

Figure 6:
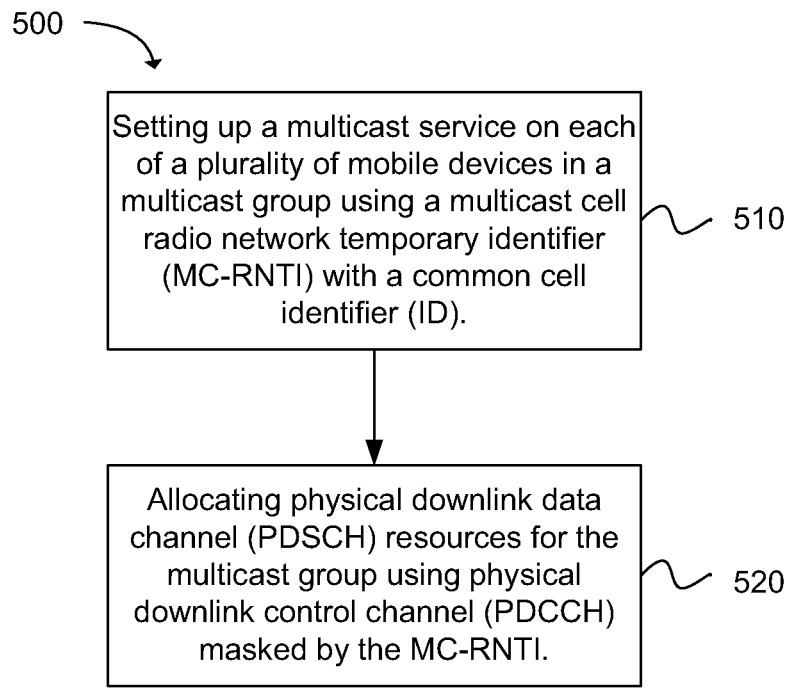
FIG. 6 depicts a flow chart of multicast servicing in an unicast subframe by a transmission station in accordance with an example.

Another example provides a method 500 for multicast servicing in a unicast subframe by a transmission station, as shown in the flow chart in FIG. 6. The method includes the operation of setting up a multicast service on each of a plurality of mobile devices in a multicast group using a multicast cell radio network temporary identifier (MC-RNTI) with a common cell identifier (CID), as in block 510. The operation of allocating physical downlink shared data channel (PDSCH) resources for the multicast group using a physical downlink control channel (PDCCH) masked by the MC-RNTI follows, as in block 520.

The operation of setting up a multicast service can include: notifying each mobile device in the multicast group of the MC-RNTI using an information element (IE) multicast configuration in radio resource control (RRC) signaling; assigning a different physical uplink control channel (PUCCH) resource for an acknowledge character (ACK) or a negative-acknowledge character (NACK) feedback resource indication for each mobile device in the multicast group; notifying each mobile device in the in the multicast group of their PUCCH resource assignment for the ACK or the NACK feedback resource indication using an information element (IE) PUCCH configuration in RRC signaling; and/or assigning a different PUCCH resource for an ACK or a NACK feedback resource indication for a subset of mobile devices in the multicast group with a signal to interference plus noise ratio (SINR) below a predetermined level. The method 500 can further include the operation of establishing a RRC connection between the transmission station and the plurality of mobile devices in the multicast group prior to notifying each mobile device in the multicast group of the MC-RNTI.

Another operation of the method 500 can include initializing a scrambling seed of a scrambler for scrambling data in a PDSCH using the MC-RNTI after setting up the multicast service. The operation of receiving an ACK or NACK feedback from at least one mobile device after transmission of a PDCCH or data in a PDSCH can also be included.

Another operation of the method 500 can include retransmitting data when a NACK feedback is received or a transmission error occurs. The operation of retransmitting data can include: retransmitting data for a single cell using cell-specific reference signals (CRS) or UE-specific reference signal (UE-RS); or retransmitting data for multiple cells using CRS where CRS interlacing is disabled. In LTE, CRS interlacing can be referred to as non-colliding CRS, and non-interlacing CRS (e.g., disabling CRS interlacing) can be referred to as colliding CRS. Another operation of the method can include retransmitting data using a hybrid automatic repeat request (HARQ) when a NACK feedback is received from a subset mobile device in a subset of mobile devices in the multicast group when an SINR is below a predetermined level for the subset mobile device.

Figure 7:
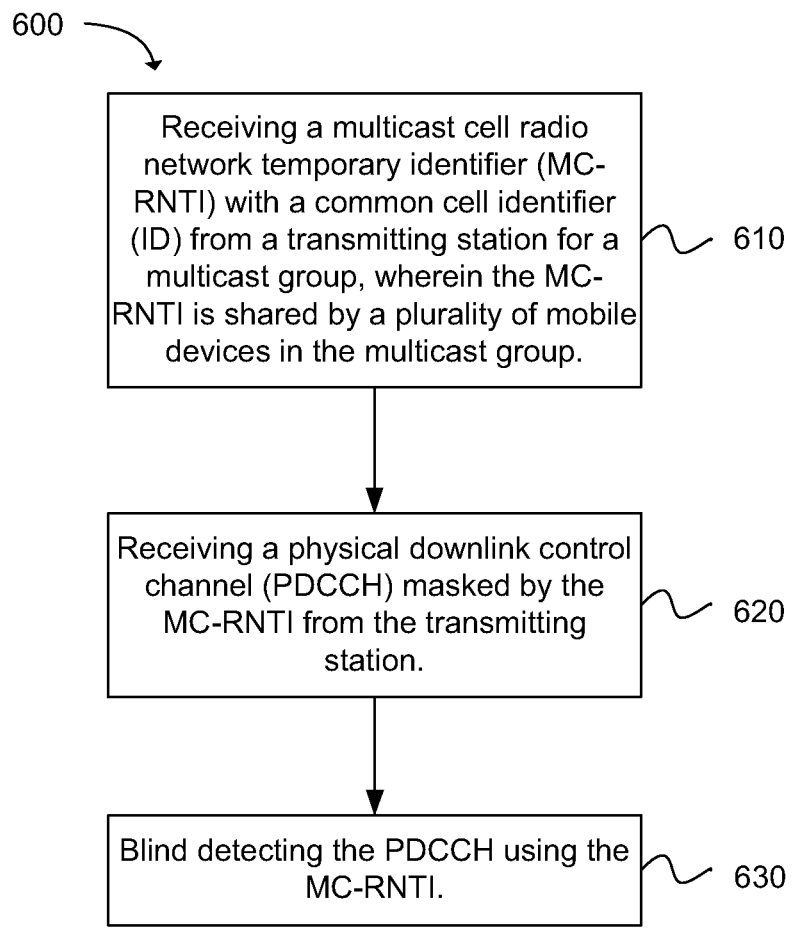
FIG. 7 depicts a flow chart of multicast servicing in an unicast subframe by a mobile device in accordance with an example.

Another example provides a method 600 for multicast servicing in a unicast subframe by a mobile device, as shown in the flow chart in FIG. 7. The method includes the operation of receiving a multicast cell radio network temporary identifier (MC-RNTI) with a common cell identifier (CID) for a multicast group from a transmitting station, wherein the MC-RNTI is shared among a plurality of mobile devices in the multicast group using an information element (IE) multicast configuration in radio resource control (RRC) signaling, as in block 610. The operation of receiving a physical downlink control channel (PDCCH) masked by the MC-RNTI from the transmitting station follows, as in block 620. The next operation of the method can be blind detecting the PDCCH using the MC-RNTI, as in block 630.

The operation of receiving the MC-RNTI can include receiving a PUCCH resource assignment for an ACK or a NACK feedback resource indication, wherein the PUCCH resource assignment for the mobile device is different from PUCCH resource assignments of other mobile devices in the multicast group. The method 600 can further include the operation of transmitting an ACK or a NACK feedback after receiving a transmission of data in a PDSCH.

Figure 8:
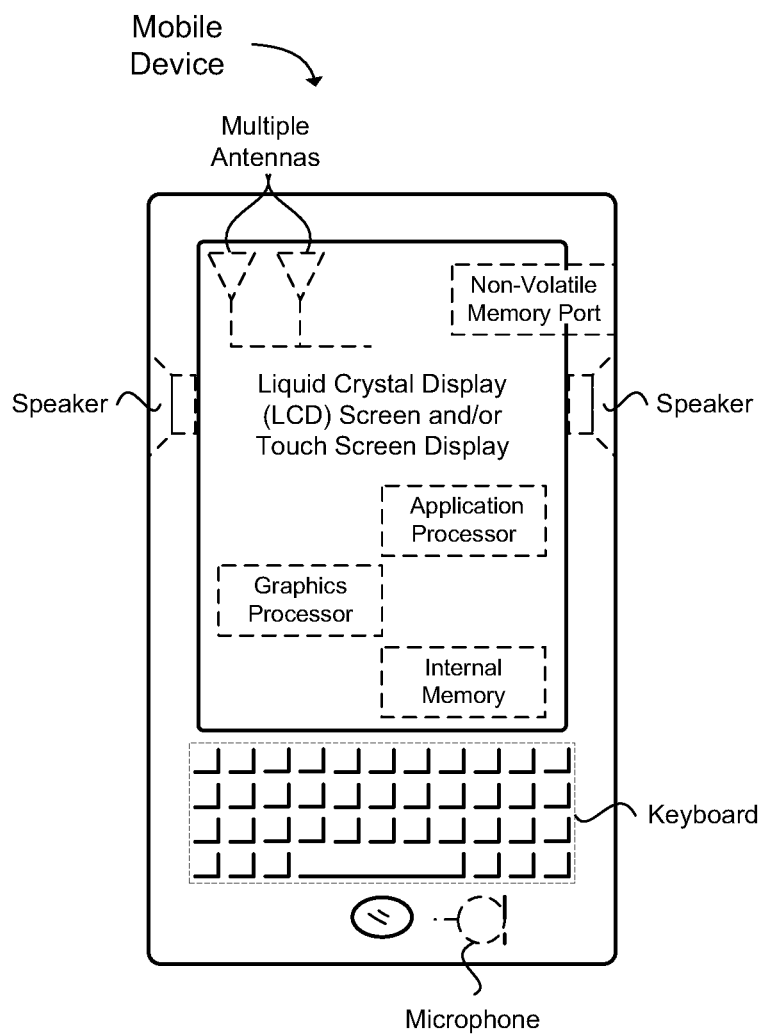
FIG. 8 illustrates a diagram of a mobile device in accordance with an example.

In another example, a transmission station can be in wireless communication with a mobile device. FIG. 8 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 8 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A computer program product, comprising a non-transitory computer readable storage medium having a computer readable program code embodied therein, the computer readable program code adapted to be executed to implement a method for multicast servicing in a unicast subframe by a transmission station, comprising:
   setting up a multicast service on each of a plurality of mobile devices in a multicast group using a multicast cell radio network temporary identifier (MC-RNTI) with a common cell identifier (CID);
   assigning a different physical uplink control channel (PUCCH) resource for an acknowledge character (ACK) or a negative-acknowledge character (NACK) feedback resource indication for a subset of mobile devices in the multicast group based on a transmission quality factor;
   allocating physical downlink shared data channel (PDSCH) resources for the multicast group using a physical downlink control channel (PDCCH) masked by the MC-RNTI; and
   assigning the different physical uplink control channel (PUCCH) resource for an acknowledge character (ACK) or a negative-acknowledge character (NACK) feedback resource indication for a subset of mobile devices in the multicast group based on the transmission quality factor, the transmission quality factor including at least one of a signal to interference plus noise ratio (SINR) below a predetermined level, a preceding matrix indicator (PMI) report, a transmission rank indicator (RI) report, or a channel quality indicator (CQI) report.

2. The computer program product of claim 1, wherein setting up the multicast service further comprises notifying each mobile device in the multicast group of the MC-RNTI using an information element (IE) multicast configuration in radio resource control (RRC) signaling.

3. The computer program product of claim 2, further comprising establishing an RRC connection between the transmission station and the plurality of mobile devices in the multicast group prior to notifying each mobile device in the multicast group of the MC-RNTI.

4. The computer program product of claim 1, further comprising initializing a scrambling seed of a scrambler for scrambling data in a PDSCH using the MC-RNTI after setting up the multicast service.

5. The computer program product of claim 1, wherein setting up the multicast service further comprises:
   assigning a different physical uplink control channel (PUCCH) resource for an acknowledge character (ACK) or a negative-acknowledge character (NACK) feedback resource indication for each mobile device in the multicast group; and
   notifying each mobile device in the in the multicast group of their PUCCH resource assignment for the ACK or the NACK feedback resource indication using an information element (IE) PUCCH configuration in radio resource control (RRC) signaling.

6. The computer program product of claim 1, further comprising receiving an acknowledge character (ACK) or negative-acknowledge character (NACK) feedback from at least one mobile device after transmission of a PDCCH or data in a PDSCH.

7. The computer program product of claim 1, further comprising retransmitting data when a negative-acknowledge character (NACK) feedback is received or a transmission error occurs.

8. The computer program product of claim 7, wherein retransmitting data further comprises retransmitting data for a single cell using cell-specific reference signals (CRS) or UE-specific reference signal (UE-RS).

9. The computer program product of claim 7, wherein retransmitting data further comprises retransmitting data for multiple cells using cell-specific reference signals (CRS) where CRS interlacing is disabled.

10. The computer program product of claim 1, further comprising retransmitting data using a hybrid automatic repeat request (HARQ) when a negative-acknowledge character (NACK) feedback is received from a subset mobile device in a subset of mobile devices in the multicast group when a signal to interference plus noise ratio (SINR) is below a predetermined level for the subset mobile device.

11. A computer program product, comprising a non-transitory computer readable storage medium having a computer readable program code embodied therein, the computer readable program code adapted to be executed to implement a method for multicast servicing in an unicast subframe by a mobile device, comprising:

receiving a multicast cell radio network temporary identifier (MC-RNTI) with a common cell identifier (CID) for a multicast group from a transmitting station, wherein the MC-RNTI is shared among a plurality of mobile devices in the multicast group using an information element (IE) multicast configuration in radio resource control (RRC) signaling;

receiving a physical downlink control channel (PDCCH) masked by the MC-RNTI from the transmitting station;

blind detecting the PDCCH using the MC-RNTI; and retransmitting data using cell-specific reference signals (CRS) or UE-specific reference signal (UE-RS) when a negative-acknowledge character (NACK) feedback is received or a transmission error occurs.

12. The computer program product of claim 11, wherein receiving the MC-RNTI further comprises receiving a physical uplink control channel (PUCCH) resource assignment for an acknowledge character (ACK) or a negative-acknowledge character (NACK) feedback resource indication, wherein the PUCCH resource assignment for the mobile device is different from PUCCH resource assignments of other mobile devices in the multicast group.

13. The computer program product of claim 12, further comprising transmitting an ACK or a NACK feedback after receiving a transmission of PDCCH or data in a PDSCH.

14. The computer program product of claim 11, wherein the mobile device is configured to connect to at least one of a wireless local area network (WLAN), a wireless personal area network (WPAN), and a wireless wide area network (WWAN), and the mobile device includes an antenna, a touch sensitive display screen, a speaker, a microphone, a graphics processor, an application processor, internal memory, a non-volatile memory port, or combinations thereof.

15. A transmission station for multicast servicing in an unicast subframe, comprising:

a processing module for generating a multicast cell radio network temporary identifier (MC-RNTI) with a common cell identifier (CID), allocating a physical downlink data channel (PDSCH) resources with a physical downlink control channel (PDCCH), and masking the PDCCH with the MC-RNTI; and a transceiver module for transmitting the PDCCH and the MC-RNTI to a mobile device using an information element (IE) multicast configuration in radio resource control (RRC) signaling and retransmit data using cell-specific reference signals (CRS) or UE-specific reference signal (UE-RS) when a negative-acknowledge character (NACK) feedback is received or a transmission error occurs.

16. The transmission station of claim 15, wherein:

the processing module is configured to generate a physical uplink control channel (PUCCH) resource assignment for an acknowledge character (ACK) or a negative-acknowledge character (NACK) feedback resource indication to at least two mobile devices, wherein each mobile device in the multicast group with a PUCCH resource assignment has a different PUCCH resource assignment from other mobile devices with PUCCH resource assignments; and the transceiver module is configured to transmit the PUCCH resource assignment to each mobile device using RRC signaling, receive an ACK or the NACK feedback from at least one mobile device, and retransmit a hybrid automatic repeat request (HARQ) when a NACK feedback is received.

17. The transmission station of claim 15, wherein the mobile device is selected from the group consisting of a user equipments (UEs) and mobile stations (MSs), and the transmission station is selected from the group consisting of an evolved Node B (eNodeB), a base station (BS), a base band unit (BBU), a remote radio head (RRH), a remote radio equipment (RRE), a relay station (RS), a radio equipment (RE), and combination thereof.

* * * * *